United States Patent Office 3,376,972
Patented Apr. 9, 1968

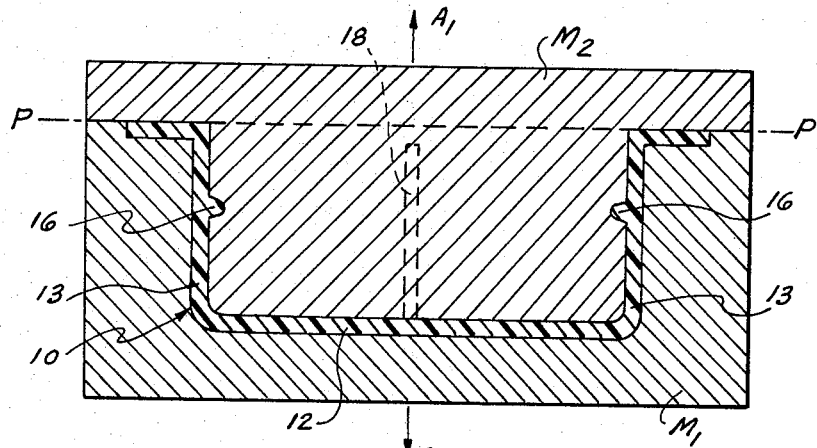
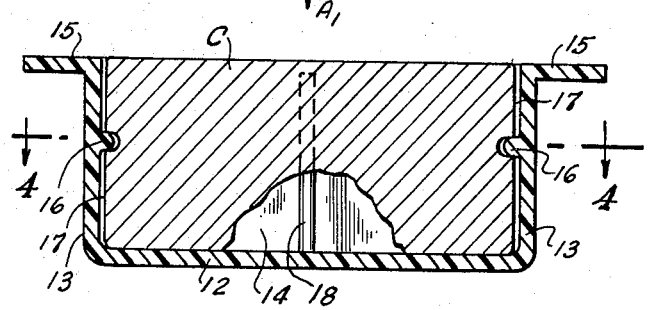
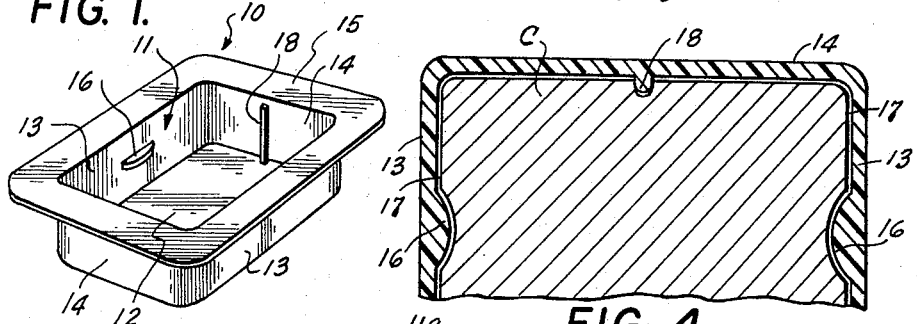
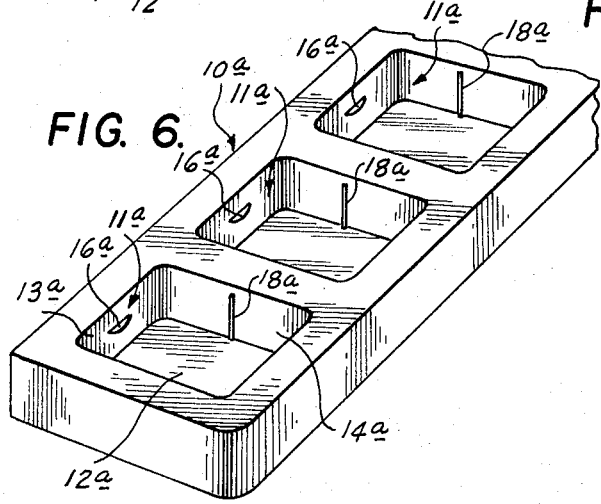
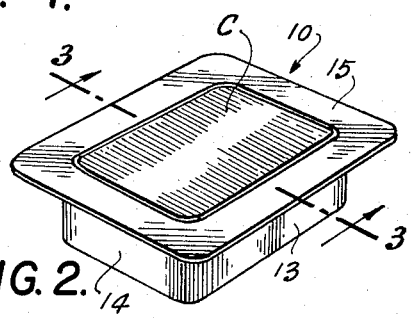
INVENTOR
MORTON SOBEL

3,376,972
PLASTIC RECEPTACLES FOR CONTAINING SOLID CAKES OF PAINT CAST THEREIN
Morton Sobel, Easton, Pa., assignor to Sobel Industries, Inc., Easton, Pa.
Filed Apr. 6, 1967, Ser. No. 629,021
4 Claims. (Cl. 206—1.8)

ABSTRACT OF THE DISCLOSURE

A plastic receptacle, such as, a cup having a single recess, or a tray having a plurality of recesses, for containing a solid paint cake cast in each recess, injection molded to be stripped from the mold parts in a direction normal to the recess bottom is formed with opposed first projections at sides of the recess between its top and bottom for holding the paint cake therein and with second projections at recess sides between the first projections to prevent shifting of the paint cake out of engagement with the first projections upon cake shrinkage, the second projections extending from the recess bottom parallel to the direction of stripping from the mold parts to avoid interference therewith.

---

This invention relates to injection molded, plastic receptacles, such as, a cup defining a single recess open at the top or a tray defining a plurality of such recesses, for containing a solid cake of water-color or other paint which is shaped or cast in each recess, and is particularly directed to improvements in such receptacles for securely holding each paint cake in the respective recess.

When a molten or otherwise liquid paint composition is cast in a recess of a tray or cup and permitted to harden therein so as to form a solid paint cake, cake undergoes shrinkage away from the sides of the recess and can fall from the latter when the tray or cup is inverted. It has been proposed to hold the solid cake in the recess by providing opposed sides of the recess with projections intermediate the bottom and open top thereof, which projections form, and are engaged in corresponding indentations in the cast solid cake. However, when the tray or cup is manufactured of plastic by injection molding, the removal of the molded receptacle from the mold cavity and its stripping from the mold parts occur in a direction normal to the bottom of the recess. Thus, the separation or stripping of the receptacle from the mold part which defines the inner surface of the recess is resisted by engagement of the formed projections in the corresponding depressions of such mold part, and separation can be effected only if the depth of the projections is suitably limited in accordance with the resilience of the plastic material.

I have found that the opposed projections of a depth which is limited to permit stripping from the mold do not reliably hold the paint cake in the recess even though the normal shrinkage of the cake may not be so large as to create a clearance between the sides of the cake and recess which is larger than the depth of the projections. With such clearance smaller than the depth of the projections, the paint cake may shift bodily in the recess toward one of the opposed projections so as to free the cake from the other projection and thus permit the cake to tilt and fall from the recess when the receptacle is inverted.

Accordingly, it is an object of this invention to provide injection molded, plastic receptacles of the described character which are capable of securely holding the paint cakes in the respective recesses even after normal shrinkage of the cakes, and without giving rise to difficulties in the injection molding of the receptacles, particularly as regards the stripping thereof from the mold.

In accordance with an aspect of this invention, each recess of the injection molded receptacle has first opposed projections at sides of the recess intermediate the bottom and open top thereof to engage in corresponding indentations formed thereby in the cake cast in the recess, and second opposed projections at sides of the recess between the first projections and extending from the bottom of the recess parallel to the direction of stripping of the receptacle from the mold so that such second projections can be of substantial depth without interfering with stripping of the molded receptacle, such second projections of interfitting with the cake cast in the recess to prevent shifting of the cake that would free the latter from the first projections.

The above, and other objects, features and advantages of the invention, will be apparent in the following detailed description of illustrative embodiments thereof which is to be read in connection with the accompanying drawing, wherein:

FIG. 1 is a perspective view of a cup-like receptacle according to this invention for receiving a single solid paint cake;

FIG. 2 is a view similar to that of FIG. 1, but showing the receptacle filled by a paint cake which has been cast therein;

FIG. 3 is an enlarged sectional view taken along the line 3—3 on FIG. 2;

FIG. 4 is a fragmentary sectional view taken along the line 4—4 on FIG. 3;

FIG. 5 is a sectional view taken in the same plane as FIG. 3, but showing the receptacle in the mold in which it is formed by injection molding; and FIG. 6 is a perspective view of a tray-like receptacle in accordance with this invention defining a plurality of recesses for receiving solid paint cakes.

Referring to the drawing in detail, and initially to FIG. 1 thereof, it will be seen that a receptacle 10 in accordance with this invention may be cup-like to define a single shallow, generally rectangular recess 11 which is open at the top and has a bottom 12, sides 13 extending upwardly from bottom 12 parallel to each other and sides 14 extending upwardly from bottom 12 parallel to each other and being orthogonally related to sides 13. If desired, an outwardly directed flange 15 may be formed along the upper edges of sides 13 and 14.

Sides 13 are formed with opposed inwardly directed projections 16 (FIGS. 1, 3 and 4), which may be centered between sides 14, as shown, and which are located intermediate the bottom 12 and open top of recess 11. Projections 16 may be elongated parallel to bottom 12, as shown.

In injection molding the receptacle 10 from a suitable plastic, such as, styrene, propylene, polyethylene, acetal resin, acrylic butyldene styrene or the like, the mold employed therefor (FIG. 5) may include mold parts $M_1$ and $M_2$ defining a suitably shaped mold cavity and being separable, at the plane P—P, by relative movements in the direction of the arrows $A_1$ which are normal to bottom 12 of the receptacle molded therein. It is apparent that, upon such separation of mold parts $M_1$ and $M_2$, the receptacle 10 is stripped from mold part $M_1$ and is retained on mold part $M_2$ by the engagement of projections 16 in the corresponding depressions of that mold part. Stripping of receptacle 10 downwardly from mold part $M_2$, that is, in a direction parallel to bottom 12, requires that sides 13 of the receptacle spring outwardly to permit release of projections 16 from the corresponding depressions of mold part $M_2$. It is apparent that the greater the depth of projections 16, the more difficult it will be to strip the receptacle 10 from the mold without tearing or mutilating those projections. Although the maximum depth of projections 16 for permitting stripping from the mold is somewhat dependent on the plastic material employed and the wall thickness of the receptacle, I have found that projections of such maximum permissible depth are not capable alone of reliably securing in recess 11 a solid cake or block C of a paint composition which has been cast in the recess (FIGS. 2, 3 and 4).

The paint cake C is cast or formed in recess 11 by pouring a molten or other liquid paint composition into the recess and then permitting such composition to harden to the solid state. In hardening to the solid state, paint cake C undergoes unavoidable shrinkage to create a clearance 17 between the sides of cake C and sides 13 and 14 of recess 11. Although such clearance 17 may be smaller than the maximum permissible depth of projections 16 so that the latter will remain engaged in the corresponding indentations cast thereby in cake C so long as clearance 17 is uniform at both sides 13, shifting of cake C toward one of sides 13, to close the clearance at that one side and to enlarge the clearance at the other side 13, may result in freeing of projection 16 at that other side 13 from the corresponding indentation of cake C. When one of projections 16 is thus freed from the cake and receptacle 10 is inverted, the cake can tilt and fall from recess 11.

In accordance with this invention, recess 11 has additional projections 18 extending inwardly from sides 14, for example, midway between sides 13, so as to be located between projections 16. It will be apparent that, when paint cake C is cast in recess 11, projections 18 cause correspondingly shaped indentations to be formed in the adjacent sides of the cake, and the engagement of projections 18 with those corresponding indentations prevents shifting of the paint cake, even after shrinking thereof, from its centered position between sides 13. Thus, projections 18 ensure that the cake will continue to be engaged by both projections 16 and thereby securely held in the recess.

In order that projections 18 will not interfere with stripping of the injection molded receptacle from mold parts $M_1$ and $M_2$, such additional projections 18 are elongated perpendicular to bottom 12 and extend from such bottom (FIGS. 1, 3 and 5). If desired, as shown, the upper end of each projection 18 may terminate slightly below the top margin of the respective side 14, whereby projections 18 will not be visible when recess 11 is filled with paint (FIG. 2).

Since projections 18 extend perpendicular to bottom 12, such projections are parallel to the direction in which the receptacle is to be stripped from mold part $M_2$ and can be made relatively deep without interfering with the stripping action. Since the depth of projections 18 need not be limited to permit stripping from the mold, the depth dimension of projections 18 can be selected only with a view to ensuring continued engagement of both projections 18 with the corresponding indentations of cake C even after shrinking of the latter and shifting of the cake against one or the other of sides 14.

As shown on FIG. 6, the present invention may also be applied to an injection molded receptacle 10a in the form of a tray having a plurality of recesses 11a each intended to contain a solid cake of paint cast therein. As a receptacle 10, each recess 11a of tray 10a has opposed projections 16a in sides 13a thereof and opposed projections 18a in sides 14a. The projections 16a and 18a of each recess 11a function in the same way as the correspondingly numbered projections of the first described embodiment to securely hold each paint cake in the respective recess, while avoiding undue interference with stripping of the tray from the mold in which it is formed.

Although illustrative embodiments of the invention have been described in detail herein with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. In the combination of a plastic receptacle having at least one recess which is open at the top with a solid cake of paint cast in said recess so as to have a configuration similar to that of the recess, the improvement comprising oppositely disposed first projections extending inwardly from sides of each said recess intermediate the bottom and the top opening of the recess, said first projections being elongated in directions parallel to said bottom of the respective recess and engaging in correspondingly shaped indentations defined in said solid cake of paint by said projections in the course of the casting of the cake in said recess thereby to resist removal of the solid cake from the recess, and second projections extending inwardly from sides of each said recess between said first projections thereof, said second projections being elongated in directions perpendicular to said bottom of the respective recess and interfitting with said solid cake molded in the recess for preventing shifting of the cake to the extent that would free said first projections from the corresponding indentations upon shrinking of the cake away from the sides of said recess.

2. The combination according to claim 1, wherein said second elongated projections reach to said bottom of the recess and have their upper ends spaced from the open top of the respective recess so as to be hidden from view when the recess is filled with the paint of the solid cake cast therein.

3. The combination according to claim 2; wherein said recess is generally rectangular, and said first and second projections are substantially centered with respect to the respective sides of the rectangular recess.

4. The combination according to claim 1; in which said receptacle is injection molded and the elongation of said second projections is in the direction of stripping of the molded receptacle from the mold parts, whereby the extension of said second projections from the respective sides of the recess is not substantially limited by the requirements for such stripping from the mold parts.

References Cited

UNITED STATES PATENTS

| 1,543,481 | 6/1925 | Patton | 206—56 |
| 2,738,606 | 3/1956 | Klein | 206—56 X |
| 2,749,245 | 6/1956 | Peters | 206—56 X |
| 2,932,386 | 4/1960 | Ushkow | 206—632. X |
| 2,955,044 | 10/1960 | Tupper. | |
| 3,039,246 | 6/1962 | David | 206—56 X |
| 3,054,679 | 9/1962 | Bradford. | |
| 3,078,986 | 2/1963 | Ushkow | 206—63.2 X |
| 3,104,665 | 9/1963 | Towns | 206—63.2 X |

MARTHA L. RICE, *Primary Examiner.*

LOUIS G. MANCENE, *Assistant Examiner.*